(12) United States Patent
Randall

(10) Patent No.: US 7,804,269 B2
(45) Date of Patent: Sep. 28, 2010

(54) CONTROL OF AN ELECTRICAL MACHINE

(75) Inventor: Steven Paul Randall, Leeds (GB)

(73) Assignee: Switched Reluctance Drives Limited, Harrogate, North Yorkshire (GB)

( * ) Notice: Subject to any disclaimer, the term of this patent is extended or adjusted under 35 U.S.C. 154(b) by 443 days.

(21) Appl. No.: 12/070,308

(22) Filed: Feb. 15, 2008

(65) Prior Publication Data

US 2008/0197793 A1   Aug. 21, 2008

(30) Foreign Application Priority Data

Feb. 15, 2007   (GB) ................. 0702975.4

(51) Int. Cl.
*H02P 23/00*   (2006.01)
(52) U.S. Cl. ................. 318/701; 318/700; 310/216.075
(58) Field of Classification Search ................. 318/700, 318/701, 721; 310/216.074, 216.075
See application file for complete search history.

(56) References Cited

U.S. PATENT DOCUMENTS

| | | | | |
|---|---|---|---|---|
| 4,883,999 A | * | 11/1989 | Hendershot | .......... 310/216.071 |
| 4,942,345 A | | 7/1990 | Horst | |
| 5,084,662 A | * | 1/1992 | Palaniappan et al. | ........ 318/701 |
| 5,539,293 A | * | 7/1996 | Randall et al. | ............. 318/616 |
| 5,767,638 A | * | 6/1998 | Wu et al. | ............... 318/400.23 |
| 5,825,112 A | * | 10/1998 | Lipo et al. | ................... 310/181 |
| 5,936,373 A | * | 8/1999 | Li et al. | ...................... 318/701 |
| 6,087,799 A | * | 7/2000 | Turner | ........................ 318/701 |
| 6,150,791 A | * | 11/2000 | Fulton | ........................ 318/701 |

FOREIGN PATENT DOCUMENTS

GB    2 302 222 A    1/1997

OTHER PUBLICATIONS

Stephenson, et al., "The Characteristics, Design and Applications of Switched Reluctance Motors and Drives," PCIM '93 Conference & Exhibition, Nürnberg, Germany, Jun. 21-24, 1993, Title page and pp. 1-31, 33-34 and 35-68.
Miller, "Electronic Control of Switched Reluctance Machines," Newnes, Power Engineering Series, Great Britain, 2001, 2 title pages and pp. 92-97.

* cited by examiner

*Primary Examiner*—Rina I Duda
(74) *Attorney, Agent, or Firm*—Haynes and Boone, LLP

(57) ABSTRACT

A switched reluctance machine has salient poles on the stator and rotor. The windings of the machine are supplied from a converter which provides energization at a chosen rate. The windings of the machine may be energized at the rate at which the rotor poles pass the stator poles, or it may be operated at a fraction of that rate by energizing the windings to cooperate with every second, third or fourth rotor pole. This can extend the output of the machine.

20 Claims, 9 Drawing Sheets

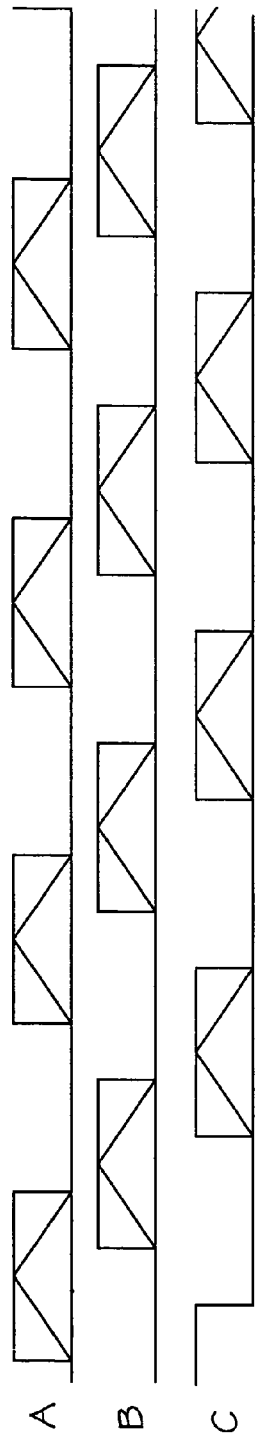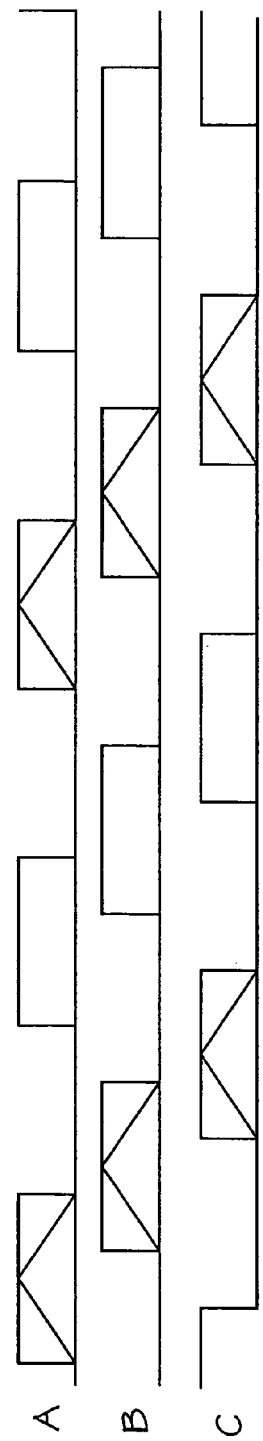

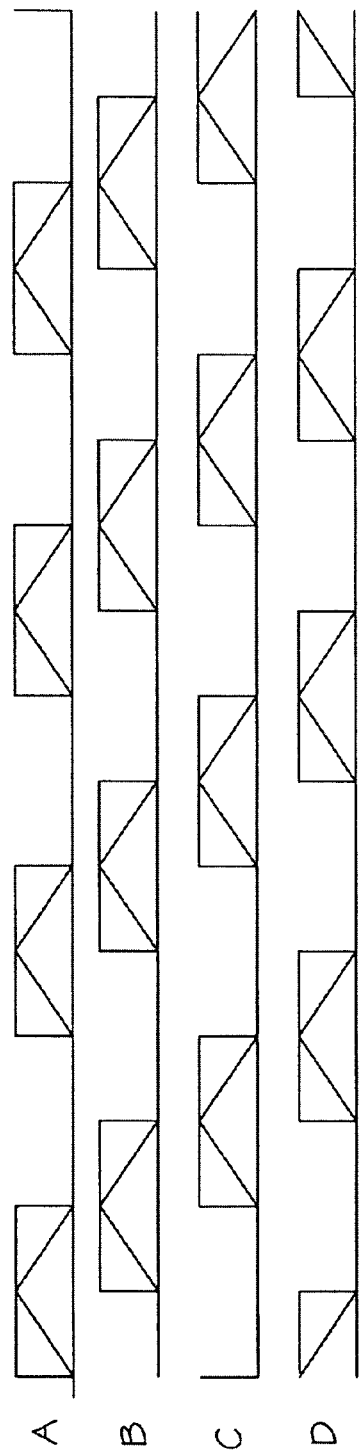
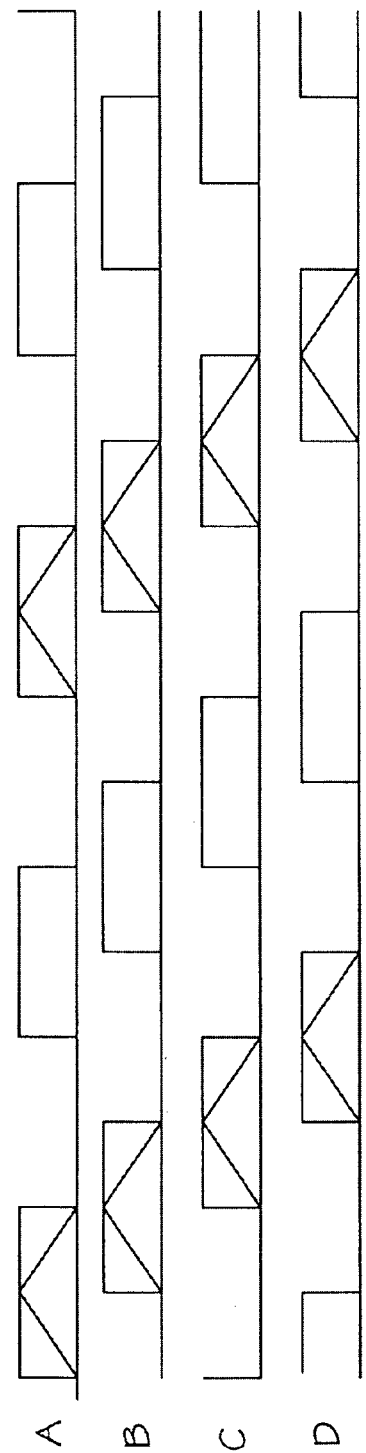

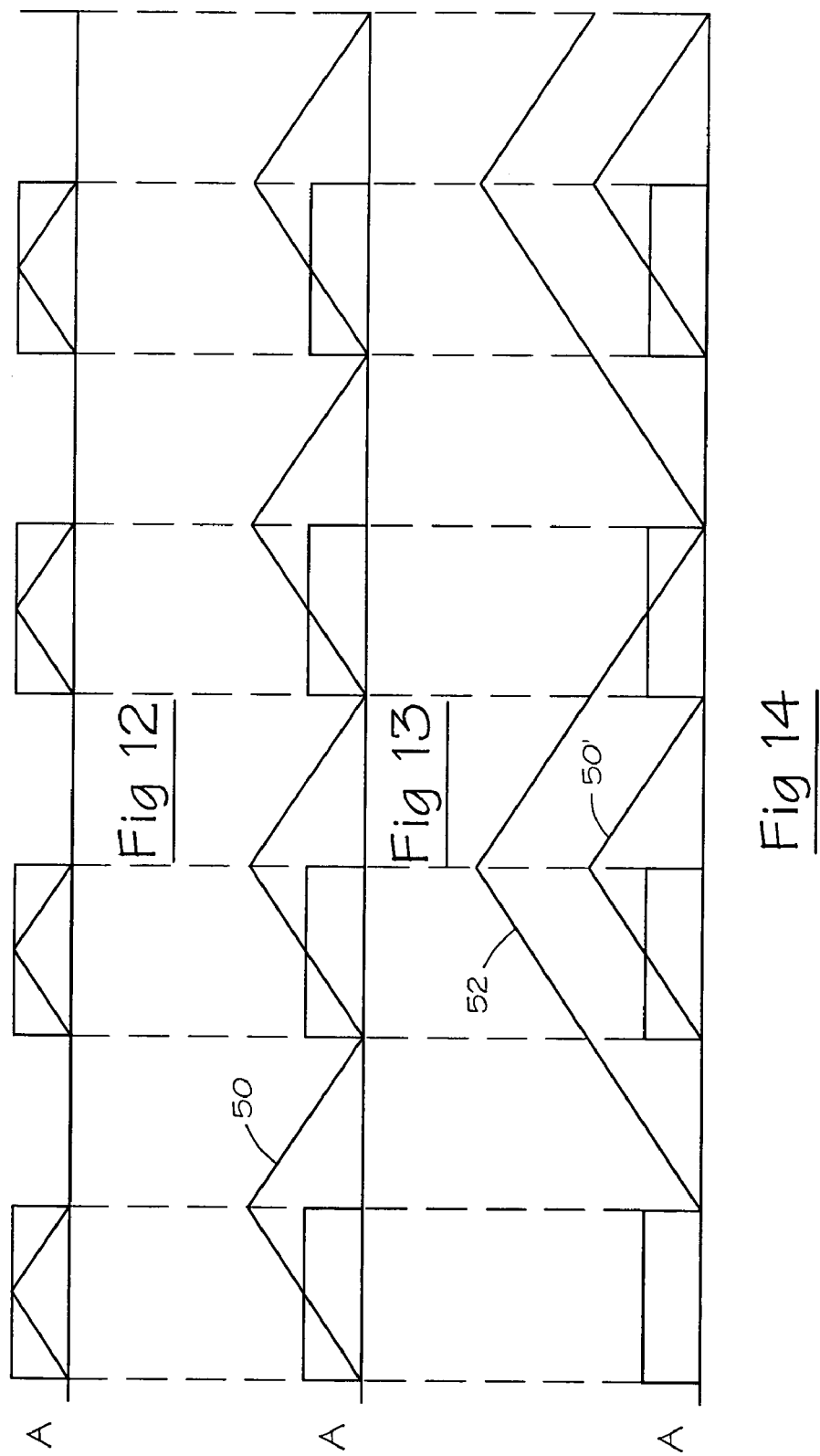

CONTROL OF AN ELECTRICAL MACHINE

The present invention generally relates to a method of controlling an electrical machine. More particularly, but not exclusively, the present invention relates to the operation of a switched reluctance machine.

One form of switched reluctance machine has a singly excited, doubly salient magnetic structure which is typically free from hard magnetic material. The presence of a rotor position detector and the use of an energisation (commonly known as 'excitation') strategy which is completely dependent on the instantaneous position of the rotor leads to these machines having the generic description of "rotor position switched". A general treatment of variable speed drives which incorporate these machines can be found in various textbooks, e.g. "Electronic Control of Switched Reluctance Machines" by TJE Miller, Newnes, 2001, incorporated herein by reference. Further details of the characteristics and operation of these drives are described in, for example, "The characteristics, design and application of switched reluctance motors and drives" by Stephenson and Blake, PCIM'93, Nürnberg, 21-24 Jun. 1993, incorporated herein by reference.

FIG. 1 shows a typical switched reluctance drive in schematic form, where the switched reluctance machine 12 is connected to a load 19. The DC power supply 11 can be rectified and filtered AC mains or a battery or some other form of electrical storage or supply. The DC voltage provided by the power supply 11 is switched across the phase windings 16 of the machine 12 by a power converter 13 under the control of the electronic control unit 14. The switching must be correctly synchronised to the angle of rotation of the rotor for proper operation of the drive, and a rotor position detector 15 is typically employed to supply signals corresponding to the angular position of the rotor. The rotor position detector 15 may take many forms, including that of a software algorithm, and its output may also be used to generate a speed feedback signal.

Many different power converter topologies are known, several of which are discussed in the Stephenson paper cited above. One of the most common configurations is shown in FIG. 2 for a single phase of a polyphase system. The phase winding 16 of the machine is connected in series with two switching devices 21 and 22 across the busbars 26 and 27. Busbars 26 and 27 are collectively described as the "DC link" of the converter. Energy recovery diodes 23 and 24 are connected to the winding to allow the winding current to flow back to the DC link when the switches 21 and 22 are opened. A low-value resistor 28 is connected in series with the lower switch to act as a current-sense resistor. A capacitor 25, known as the "DC link capacitor", is connected across the DC link to source or sink any alternating component of the DC link current (the so-called "ripple current") which cannot be drawn from or returned to the supply.

FIG. 3(a) shows a schematic cross section of a typical 3-phase switched reluctance machine, in which the stator has three pairs of salient poles and the rotor has four poles. Each stator pole carries a coil and diametrically opposite pairs of coils are connected, either in series or in parallel, to form a phase winding 16. FIG. 3(a) shows the phase winding for Phase A: the other phases are formed similarly. The inductance of each phase winding varies as the rotor rotates because of the saliency of the magnetic structure. The phase inductance cycle of a switched reluctance machine is the period of the variation of inductance for the, or each, phase, for example between maxima when the rotor poles and the relevant respective pair of stator poles are fully aligned.

An idealised form of the inductance curve for a phase is shown in FIG. 3(c). In practice, the sharp corners at $L_{min}$ and $L_{max}$ are rounded due to flux fringing and to saturation of the magnetic circuit. The maximum value of inductance would also be current dependent. Nevertheless, this curve is useful to illustrate the general behaviour of the machine. As explained in more detail in the Stephenson paper cited above, the maximum inductance region for a phase winding, $L_{max}$, is centred around the rotor position where a pair of rotor poles is fully aligned with the pair of stator poles carrying the winding. This is shown in FIG. 3(a). Similarly, the minimum inductance region, $L_{min}$, corresponds to the position where the interpolar axis on the rotor is aligned with the stator pole axis, as shown in FIG. 3(b) for phase A.

The performance of a switched reluctance machine depends, in part, on the accurate timing of phase energisation with respect to rotor position. Detection of rotor position is conventionally achieved by using a transducer 15, shown schematically in FIG. 4(a), such as a rotating toothed disk 41 mounted on the machine rotor, which co-operates with optical or magnetic sensors 42, 43, 44 mounted on the stator. A pulse train indicative of rotor position relative to the stator is generated and supplied to control circuitry, allowing accurate phase energisation. Typically, a single sensor is used for 1 - and 2-phase systems; three sensors for a 3-phase system; and either 2 or 4 sensors for a 4-phase system. The disk usually has the same number of castellations as there are rotor poles and is proportioned so as to give an equal mark:space ratio on the outputs of the sensors.

The sensors are distributed around the perimeter of the vane at angles which correspond to the displacement angles of the inductance profiles of the phases, and are typically positioned relative to the stator poles so that the rising and falling edges of their output waveform occur at $L_{min}$ and $L_{max}$, respectively. This results in the signals from the sensors having relationships with each other as shown in FIG. 4(b). The sensors output a binary signal which is periodic with the inductance cycle of the machine and has two transitions per cycle. The transitions are therefore indicative of events in the inductance cycle of the machine, in relation to which a control action can take place. These signals are typically used by the control system to generate the correct instants for energisation of the windings of the machine. The combined signal shown in FIG. 4(b) indicates the incidence of either a rising or falling edge in any of the individual waveforms and is useful in determining when a control action is required.

FIG. 5 shows typical waveforms for an operating cycle of the circuit shown in FIG. 2 when the machine of FIG. 3 is operating in a motoring single-pulse mode. When used in connection with the windings, the terms "energising" and "energisation" denote that voltage is applied to a winding to effect an increase in the flux linkage associated with the winding. Similarly, "de-energising" and "de-energisation" denote a reverse voltage applied to effect a decrease in the flux-linkage. FIG. 5(a) shows the voltage being applied at the "on angle" $\theta_{on}$ for the duration of the conduction angle $\theta_c$ when the switches 21 and 22 are closed, thereby energising one of the phases. The flux linking the coil is the time integral of the voltage and, for the ideal case of zero winding resistance, ramps up linearly as shown. FIG. 5(b) shows the corresponding current in the phase winding 16 rising to a peak and then falling.

At the end of the conduction angle, the "off angle" $\theta_{off}$ is reached, the switches are opened and the current transfers to the diodes, placing the inverted link voltage across the winding and hence forcing down the flux and the current to zero. At zero flux and zero current, the diodes cease to conduct and the circuit is inactive until the start of a subsequent conduction period. Although the current in the phase winding is unidirectional, the current on the DC link reverses when the switches are opened, as shown in FIG. 5(c), and the returned current represents energy being returned to the supply.

With this excitation procedure, which is typically adopted at higher speeds in the speed range of the drive, the shape of the current waveform varies depending on the operating point and on the switching strategy adopted, though the triangular flux waveform is essentially unchanged.

As is well-known and described in, for example, the Stephenson paper cited above, low-speed operation generally involves the use of current chopping to contain the peak currents, and switching off the switches non-simultaneously gives an operating mode generally known as "freewheeling".

UK Patent GB 2302222 (Samsung) discloses a method of driving a switched reluctance motor by altering the sequence of energisation of the phases of a machine as a function of speed.

U.S. Pat. No. 4,942,345 (Horst) discloses a method of starting a machine using all its phase windings and continuing operation on a single phase winding above a certain speed.

The prior art does not contemplate an advance in the way an electrical machine can be operated without modifying the sequence in which the phases are energised while a machine is in operation.

Two particular points about the conventional operation described above have been noted by the inventor. Firstly, the repetition rate at which each phase is energised corresponds exactly to the rate at which the rotor poles pass any given stator pole. For example, if the pole A in FIG. 3(a) is considered, then to produce motoring action, the phase winding A is energised each time a rotor pole approaches. Another way to describe this action is to say that the stator pole pulls on every passing rotor pole in turn. Similar considerations apply in producing a generating action, mutatis mutandis.

Secondly, the sequence of operation of the phases is important. Inspection of FIG. 3 shows that for an excitation sequence of ABCABC (i.e. counter-clockwise around the stator) the rotor rotates clockwise as each pair of rotor poles comes into positions at which each phase in turn can be energised to pull on the rotor. This is in complete contrast to electromagnetic machines with rotating fields, where the rotor generally travels in the same direction as the field. By reversing the sequence to ACBACB, the rotor now rotates counter-clockwise. The same procedure applies to higher numbers of phases: e.g. for a four-phase system the sequence ABCD gives rotation in one direction, while reversing the sequence to ADCB gives rotation in the opposite direction.

The present invention is defined in the accompanying independent claims. Some preferred features of the invention are recited in the claims respectively dependent thereon.

According to embodiments there is provided a method of operating an electrical machine, the machine having a stator defining stator poles, a rotor defining rotor poles, the rotor being movable relative to the stator so that the rotor poles are successively alignable with any stator pole, and independently energisable phase windings, each associated with at least a pair of stator poles and having an inductance cycle determined by the passage of the rotor poles past the stator poles, the method comprising: in a first mode of operation, initiating the energisation of the phase windings in a predetermined sequence and for consecutive inductance cycles of each phase in turn; and in a second mode of operation, initiating the energisation of the phase windings in the same sequence, in which initiation of energisation of each phase winding is followed by at least one inductance cycle of that phase with no initiation of energisation.

According to another embodiment there is provided a method of operating an electrical machine, the machine having a stator defining stator poles, a rotor defining rotor poles, the rotor being movable relative to the stator so that the rotor poles are successively alignable with any stator pole, and independently energisable phase windings, each associated with at least a pair of stator poles and having an inductance cycle determined by the passage of the rotor poles past the stator poles, the method comprising: in a first mode of operation initiating energisation of the phase windings in a predetermined sequence, in which the rate of initiating energisation is equal to the rate at which rotor poles coincide with a given stator pole, and in a second mode of operation initiating energisation of the phase windings in the same sequence, in which the rate of initiating energisation of the phase windings is less than the rate at which rotor poles coincide with a given stator pole.

By selecting which occurrences of the phase inductance cycles in which to begin the energisation of the phase windings, it is possible to increase the interval for growth and decay of the flux in a phase before the start of the next energisation The consequent increased interval between energisations of the same phase can be realised by beginning the energisation in successive occurrences of the phase inductance cycle for consecutive phases in sequence followed by a plurality of consecutive inductance cycles with no energisation. For example, the plurality may comprise a number of occurrences of the phase inductance cycle equal to the number of phases or an integer multiple of the number of phases. In this particular form the sequence is maintained in a 'burst' of energisations of the phases followed by one or more groups of occurrences of the phase inductance cycle in which no energisation takes place.

Alternatively, the increased interval between energisations of the same phase can be realised by having the start of an energisation period for a first one of the phases in the sequence, followed by a plurality of consecutive inductance cycles with no energisation and, thereafter, having the start of an energisation period for a second phase in the sequence, and so on. Energisation is left until the rotor and stator positions are arranged for subsequent energisation of the next phase in the sequence, and so on. Thus, the plurality of consecutive unenergised inductance cycles for a given phase is equal to an integer multiple of the number of the phases in the machine.

Embodiments of the invention also have the advantage of reducing the overall switching frequency in the controller, and in the machine itself. This has beneficial implications for the efficiency of the machine operation.

Embodiments of the invention also extend to an electrical machine drive system comprising: a stator defining stator poles; a rotor defining rotor poles, the rotor being rotatable relative to the stator so that the rotor poles are successively alignable with any stator pole, independently energisable phase windings each associated with at least a pair of stator poles, a controller operable to initiate the energisation of the phase windings in a predetermined sequence, the initiation of the energisation of the phase windings occurring in some part of consecutive inductance cycles of the windings in turn in a first mode of operation, and energisation of the phase windings being initiated in the same sequence in which initiation of each phase winding being followed by at least one inductance cycle of that phase with no initiation of energisation, in a second mode of operation.

The initiation of energisation of the phase windings in the second mode may comprise the sequence of consecutive energisations of the phase windings followed by a plurality of consecutive inductance cycles with no energisation.

Alternatively, the initiation energisation of the windings in the second mode may comprise having the start of an energisation period for a first phase winding in the sequence followed by a plurality of inductance cycles not having the start of an energisation period and, thereafter, energisation of a second phase winding in the sequence.

In general, the plurality of consecutive unenergised inductance cycles corresponds to the number of phases in the machine, but could be an integer multiple of the number of phases.

According to other embodiments there is provided a method of operating an electrical machine having: a stator defining stator poles; a rotor defining rotor poles; independently energisable phase windings, each associated with at least a pair of the stator poles, the rotor poles being movable past each at least pair of stator poles to produce a machine output when the phase windings are energised, the method comprising: energising the phase windings consecutively in a fixed sequence in which the starts of energisation periods of the phases is separated by an interval in which the rotor poles align with the stator poles of the phases a number of times equal to an integer multiple of the number of phases of the machine.

According to other embodiments there is provided a method of operating an electrical machine having: a stator defining stator poles; a rotor defining rotor poles; independently energisable phase windings each associated with at least a pair of the stator poles, the rotor being movable past each at least pair of stator poles to produce a machine output when the phase windings are energised, the method comprising: energising the phase windings in a fixed sequence in which the start of an energisation period of one of the phase windings is separated from the next energisation in the sequence by an interval in which the rotor poles align with the stator poles of the phases a number of times equal to an integer multiple of the number of phases of the machine.

Other aspects and advantages of the invention will become apparent upon reading the following detailed description of exemplary embodiments of the invention and upon reference to the accompanying drawings, in which:

FIG. 6 shows an energisation pattern for a 3-phase machine;

FIG. 7 shows an energisation pattern according to an embodiment of the invention;

FIG. 8 shows an energisation pattern for a 4-phase machine;

FIG. 9 shows an energisation pattern according to an embodiment of the invention;

FIG. 12 shows an energisation pattern for one phase winding;

FIG. 13 shows a limiting energisation pattern;

FIG. 14 shows an energisation pattern according to an embodiment of the invention.

Figure 4A:
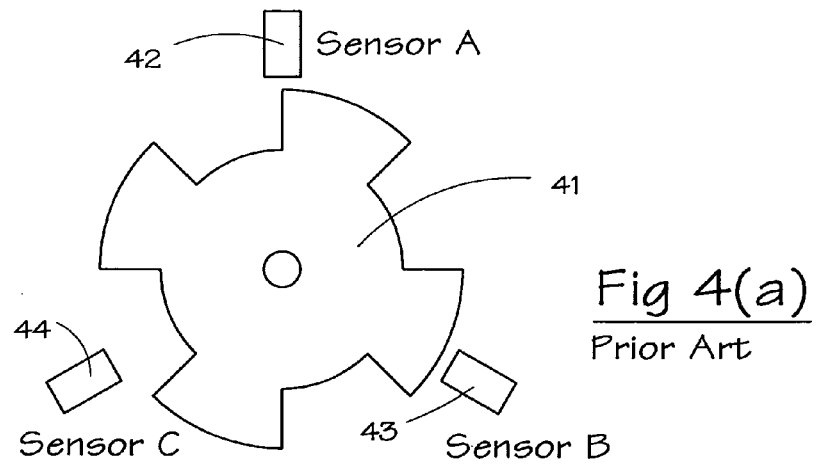
FIG. 4(a) shows a schematic view of a rotor position transducer with three sensors.
Figure 4B:
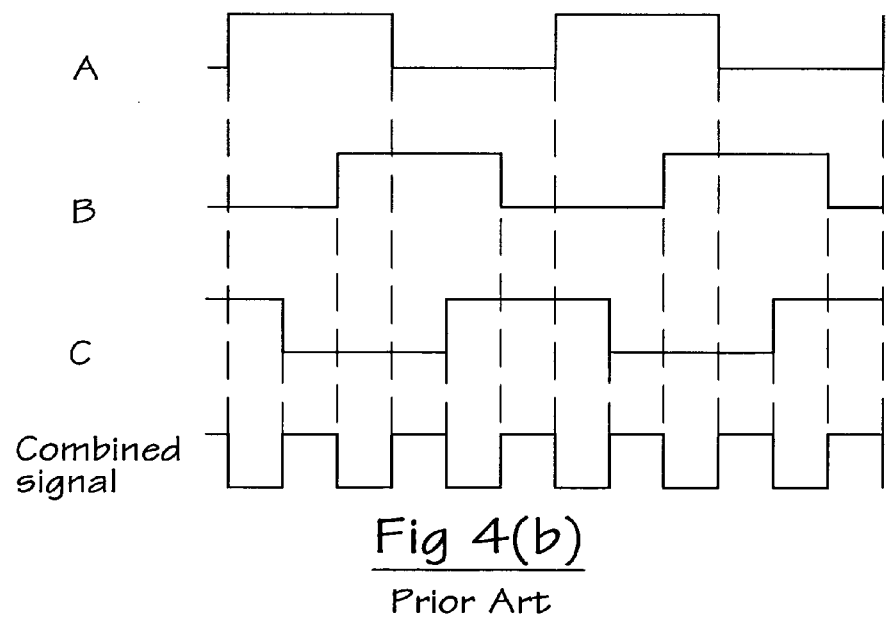
FIG. 4(b) shows the output waveforms of the sensors of FIG. 4(a)
Figure 5A:
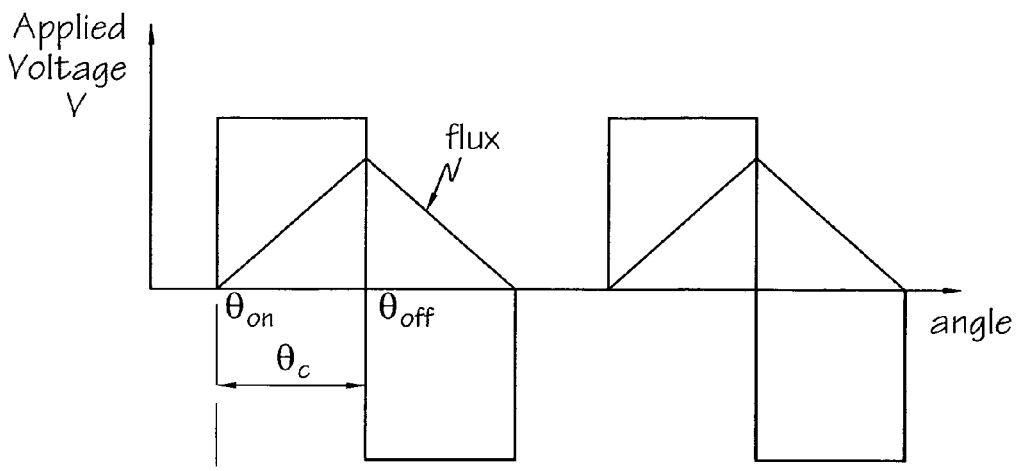
FIG. 5(a) shows voltage and flux waveforms.
Figure 5B:
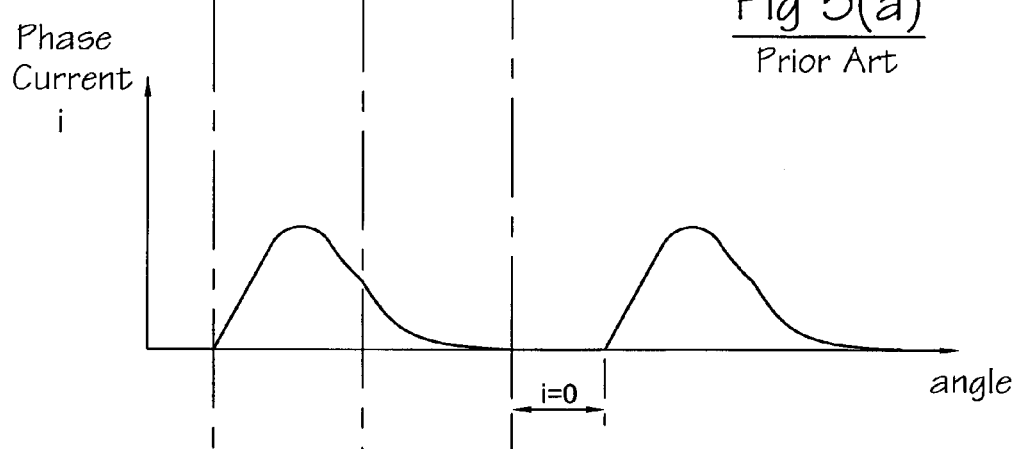
FIG. 5(b) shows phase current waveforms corresponding to FIG. 5(a)
Figure 5C:
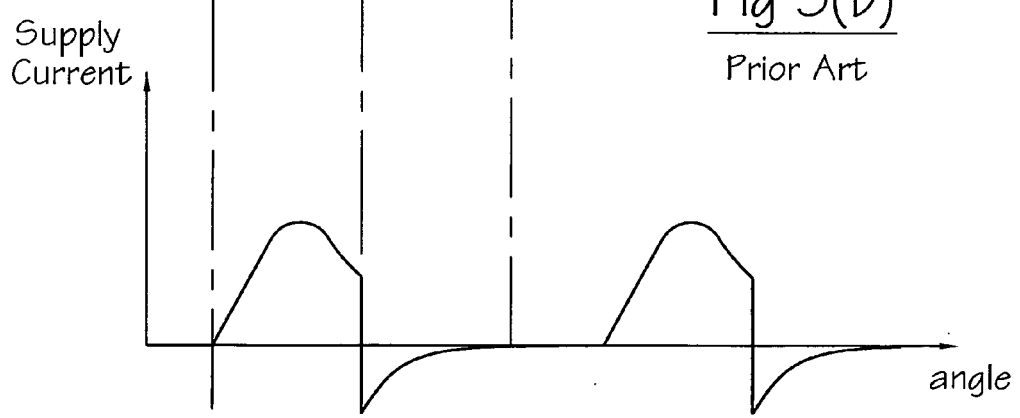
FIG. 5(c) shows supply current waveforms corresponding to FIG. 5(b)

FIG. 6 shows the rectangular sensor output waveforms of FIG. 4(b) with the triangular phase flux waveforms superimposed. The operating point of the system has been arbitrarily taken for illustration as switching on at the rising edge of the sensor waveform (i.e., typically $L_{min}$) and switching off a quarter of a cycle later. This is for the purposes of illustration. The operating points of switch-on, to initiate energisation and drive the flux up, and switch-off, to drive the flux down, will vary. The phases of the machine are energised in the predetermined sequence ABC.

FIG. 7 shows one embodiment in graphical terms. The machine is still operating at the same speed as it was for FIG. 6. The rate at which the rotor poles pass a stator pole is therefore the same. Thus, the period of the sensor waveform is the same. However, each phase is now energised at a lower rate, in this case one half of the original rate. Instead of operating on each pair of rotor poles as they approach the phase, it operates on every second pair of rotor poles which approach the stator poles of that phase. The predetermined sequence of initiating energisation of the phases is unchanged, since it is still ABC and may be represented as ABC000ABC000. Between successive occurrences of the pattern ABC, there is now a gap before another pattern ABC, i.e. consecutive energisations of the phases in sequence are followed by a number of consecutive phase inductance cycles equal to the number of phases in the machine in which there are no phase energisations. The phase energisation rate is now half the rate at which the rotor poles pass the stator poles.

By inspection of FIG. 7, it will be noted that the energisation rate could equally well be reduced to one third of the original (by operating on every third pair of passing poles) or one fourth of the original (by operating on every fourth pair of passing poles). In each case, the predetermined sequence of initiating energisation of the phases remains unchanged.

The invention is not limited to 3-phase systems. FIG. 8 shows a conventional 4-phase system operating with an energisation sequence ABCD. FIG. 9 shows the machine operating with a phase energisation rate which is one half of that in FIG. 8, i.e., operating on every second pair of passing poles to give a pattern of ABCD0000ABCD0000. The initiation sequence for energisation of the phases is unchanged. In a similar way, the machine can be operated at a repetition rate of one third, one fourth or one fifth of the original rate by operating on every third, fourth or fifth pair of passing rotor poles, respectively.

Figure 10:
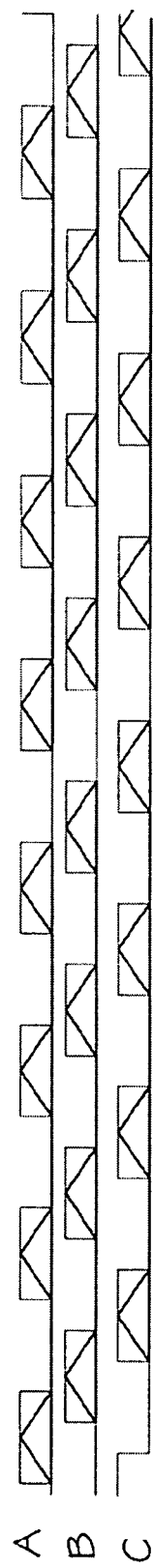
FIG. 10 shows an energisation pattern for a 3-phase machine.
Figure 11:
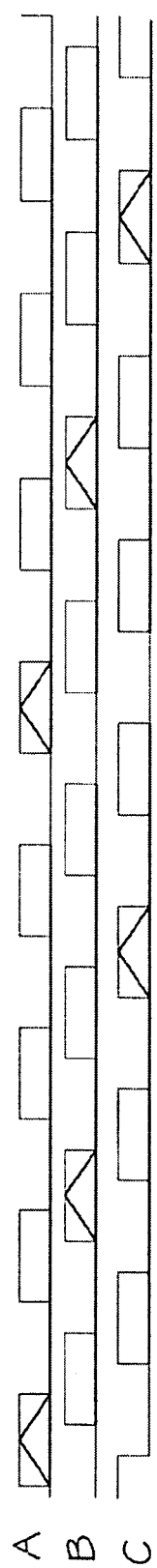
FIG. 11 shows an energisation pattern according to an embodiment of the invention.

Another embodiment will now be described. FIG. 10 shows the conventional operation of a 3-phase machine, as previously shown in FIG. 6. If a full inductance cycle is inserted before initiating the energisation of successive phases, the pattern of FIG. 11 is obtained. The pattern could be represented as A000B000C000, i.e. energisation of each phase in turn separated by a plurality of consecutive phase inductance cycles equal to the number of phases in the machine. Each phase winding operates on every fourth pole, but the energisation is more evenly spread than is obtained with the embodiment described above. The predetermined energisation sequence of the phase windings remains unaltered. The corresponding 4-phase pattern would be A0000B0000C0000D0000, i.e. operating on every fifth rotor pole.

One of the advantages of embodiments described is that, for a given speed, the period available to build and reduce the flux is greatly extended. Consider the conventional operation of the 3-phase system as shown in FIG. 12 showing the interval available for causing a flux waveform. According to conventional teaching, the switch-off angle of the phase excitation can be extended to produce more output from the machine until it results in the flux triangle 50 shown in FIG. 13. This is the normal limit on the interval available for the flux to return to zero in an electrical cycle. No further extension was possible without entering the region where flux is continuous over successive cycles. While schemes exist in which it is possible to maintain control in this 'continuous current' mode, it is still a region which is inherently unstable as the non-zero flux at the end of an electrical cycle leads to progressive flux growth in subsequent cycles. However, by operating according to the invention, the flux triangle 52 can be greatly extended, for example as shown in FIG. 14, thus increasing the output of the machine.

While FIG. 14 is drawn for the ideal case of a machine with zero resistance, a practical machine will have resistance, resulting in the flux trajectory being non-linear and the flux growth segment being longer than the flux decay segment. In this event, the energisation period can be slightly longer than the de-energisation period without the flux and current being continuous. The working of the invention is unaffected by this, since the energisation is initiated in one inductance cycle and there is no initiation in the next cycle, exactly as before.

Likewise, the invention can be operated in the 'continuous current' mode of a switched reluctance machine, in which the current does not reach zero, but is kept from operating in an unstable manner by controlling the volt-seconds applied to the windings. This is described in U.S. Pat. No. 5,563,488, which is incorporated herein by reference. In this continuous current mode, the initiation of energisation in each phase in sequence is as described above in relation to the single pulse mode of operation but the current will not, of course, return to zero within an inductance cycle.

As before, the depiction of the points at which the supply voltage is applied to the winding in FIGS. 12 to 14 is illustrative only. Actual timing will depend on various factors of machine design, the nature of the load and the duty the machine is to perform. Thus, in respect to the embodiments described, the increased flux shown in the increased period between energisations of the same phase is notional to represent the potential for extra flux that exists. The angle of the rotor relative to the stator at which energisation of the phase is initiated is chosen according to operational need. Likewise, the duration of the conduction angle for which the voltage is applied to the phase winding is chosen according to need.

Another advantage of operating according to the described embodiments is that the switching frequency in both the electronic controller and the machine is significantly reduced, which will lead to a reduction in the associated losses, thereby raising the efficiency of the drive system.

The disclosed embodiments effect selective energisation of the phases so that there are occurrences of the phase inductance cycle in a given machine sequence that could be used to 'pull' the rotor around, but that are left unenergised. The machine can run conventionally at (for example) lower speeds and/or from start-up where the switching duty is more easily handled by the control and switching apparatus of the drive. For higher speed operation, the invention can be used to relax the switching burden and to gain efficiency without changing the sequence of operation of the phases. Alternatively, the machine can be operated exclusively according to any of the disclosed embodiments according to a fixed sequence of energisation of the phase windings.

Figure 1:
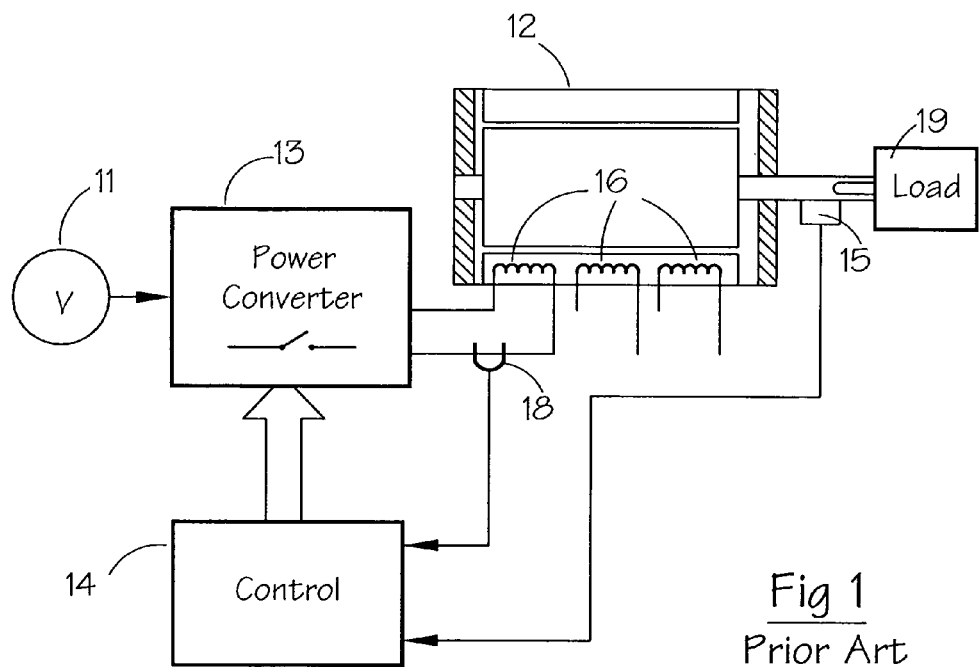
FIG. 1 is a schematic drawing of a prior art switched reluctance drive operating as a motor.
Figure 2:
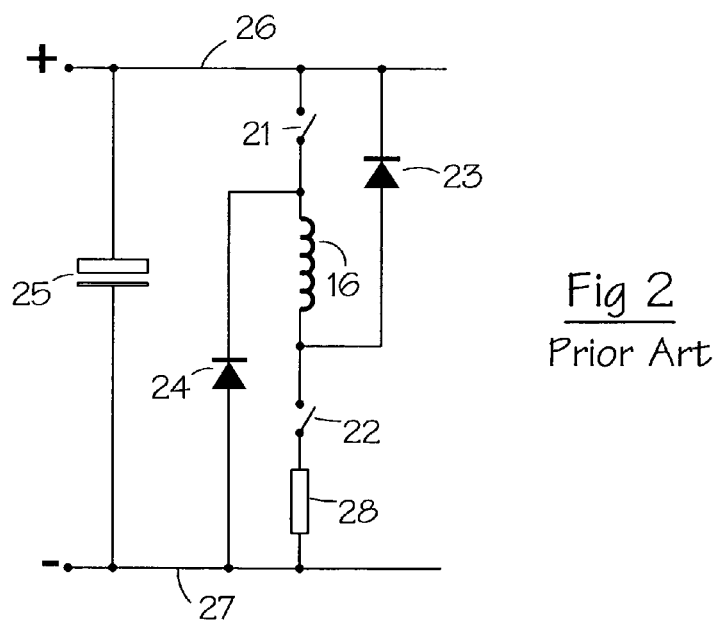
FIG. 2 is a prior art energisation circuit for one phase of the switched reluctance machine of FIG. 1.
Figure 3A:
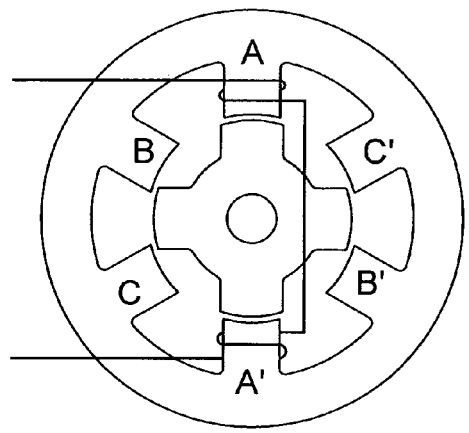
FIG. 3(a) shows a schematic cross section of a switched reluctance machine.
Figure 3B:
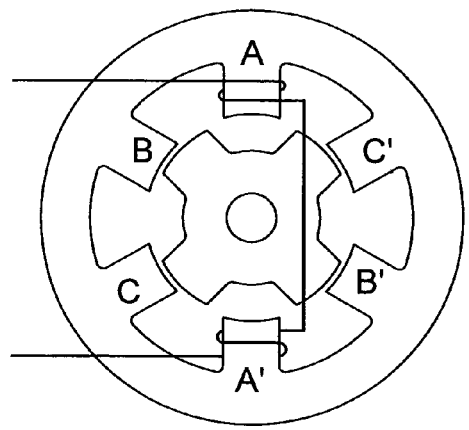
FIG. 3(b) shows another cross section of the machine of FIG. 3(a) with the rotor in a different position.
Figure 3C:
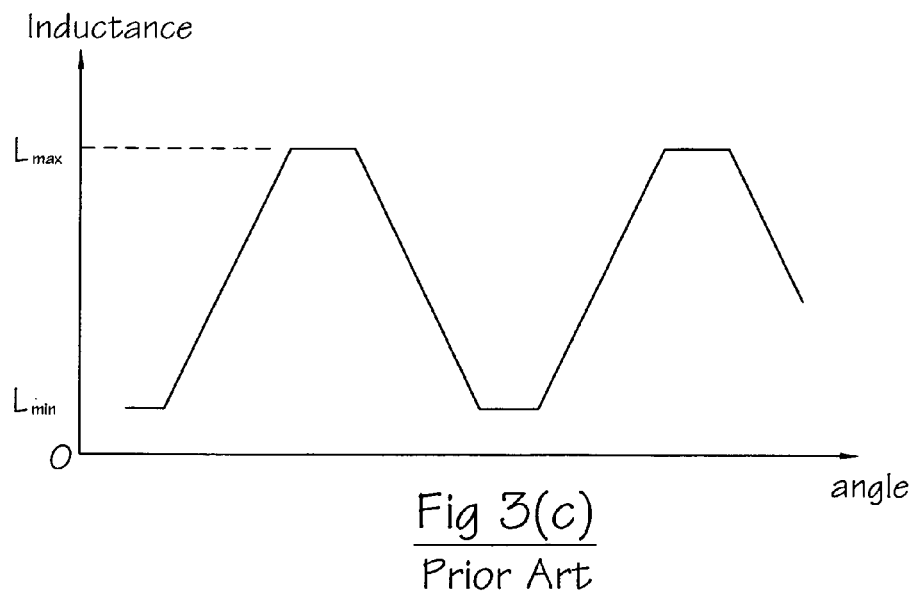
FIG. 3(c) shows an inductance waveform for a phase winding.
Figure 15:
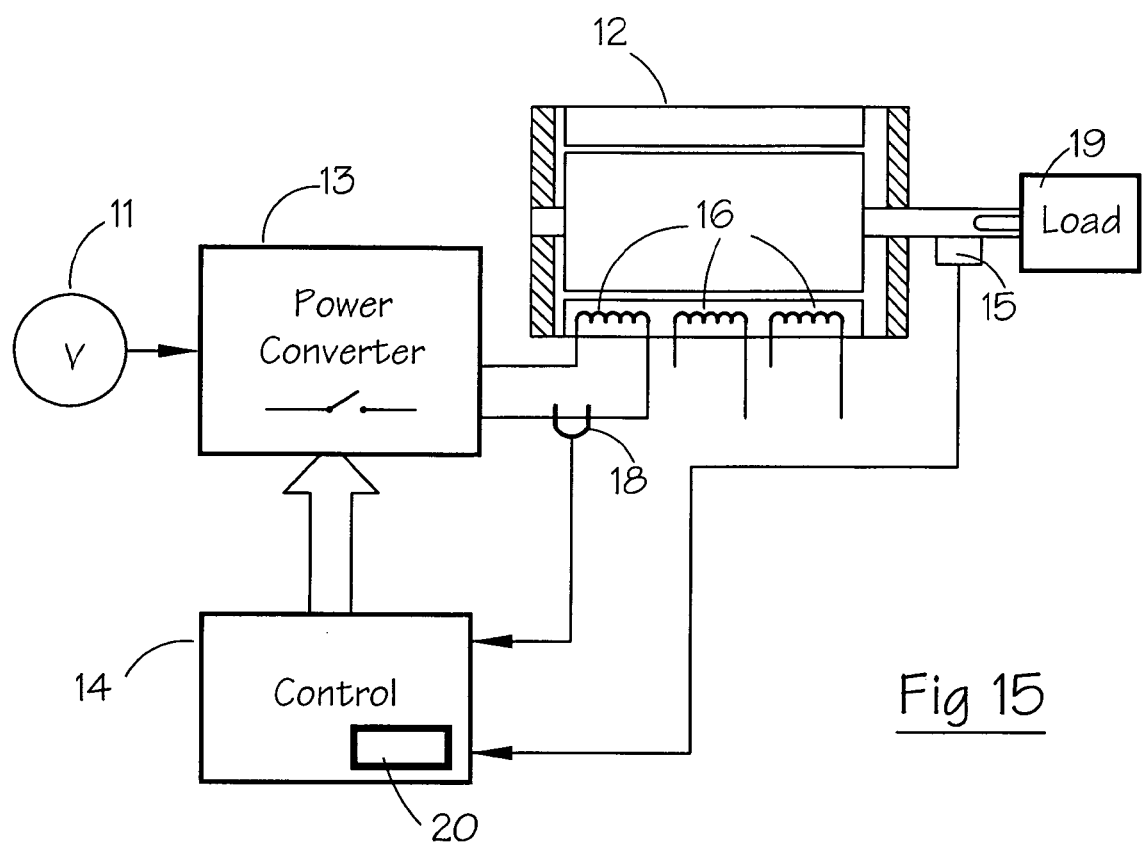
FIG. 15 shows a schematic drawing of a switched reluctance drive for implementing the disclosed embodiments.

FIG. 15 shows a switched reluctance machine drive which is similar to that shown in FIG. 1 and like reference numerals have been used where appropriate. The above described embodiments are implemented by the commands sent from the controller 14 to the power converter 13. The switching commands are generated in accordance with a program that can be stored as software, firmware or hardware. In this embodiment the controller 14 is programmed in read only memory (ROM) 20 to execute control of the switches of the power converter 13. The controller 14 receives rotor position information and other machine parameter feedback to put into effect essentially conventional control of the machine (motoring or generating) at start-up and low speeds. The controller 14 is also programmed to transition to control of the machine as described above in accordance with any of the disclosed embodiments at higher speeds. The transition may be effected either because it is beneficial to relax the switching frequency or to enable more time per initiation of energisation for flux growth and subsequent decay, as described above.

The skilled person will appreciate that variation of the disclosed arrangements are possible without departing from the invention. For example, the rotor may have more than 2 (for example 3 or 4) pairs of rotor poles that are magnetically salient. Also, the specific embodiments are disclosed in relation to reluctance machines, but it will be appreciated that the invention is applicable to any electrical machine with salient poles and independently energisable phase windings. Likewise, the invention is equally applicable to any such switchable machine whether acting as a motor or a generator. Further, the invention is also equally applicable to both rotary and linear machines. The movable part of a linear machine is often referred to by those of ordinary skill in the art as the rotor. Accordingly, the above description of several embodiments is made by way of example and not for the purposes of limitation. The present invention is intended to be limited only by the scope of the following claims.

What is claimed is:

1. A method of operating an electrical machine, the machine having
    a stator defining stator poles,
    a rotor defining rotor poles, the rotor being movable relative to the stator so that the rotor poles are successively alignable with any stator pole,
    and independently energisable phase windings, each associated with at least a pair of stator poles and having an inductance cycle determined by the passage of the rotor poles past the stator poles, the method comprising:
    in a first mode of operation, initiating the energisation of the phase windings in a predetermined sequence and for consecutive inductance cycles of each phase in turn; and
    in a second mode of operation, initiating the energisation of the phase windings in the same sequence, in which initiation of energisation of each phase winding is followed by at least one inductance cycle of that phase with no initiation of energisation.

2. A method as claimed in claim 1 in which the energisation of the phase windings in the second mode comprises initiating the energisation of the sequence of phase windings consecutively, followed by a plurality of consecutive inductance cycles with no initiation of energisation.

3. A method as claimed in claim 2 including setting the plurality of consecutive inductance cycles to correspond to the number of phase windings in the machine.

4. A method as claimed in claim 1 in which the energisation of the phase windings in the second mode comprises initiating the energisation of a first phase winding in the sequence followed by a plurality of consecutive inductance cycles with no initiation of energisation and, thereafter, initiating the energisation of a second phase winding in the sequence.

5. A method as claimed in claim 3 including setting the plurality of consecutive inductance cycles to correspond to the number of phase windings in the machine.

6. A method as claimed in claim 1 including configuring the machine to have three or four phase windings.

7. A method as claimed in claim 1 including selecting as the electrical machine a switched reluctance machine.

8. A switched reluctance drive system comprising:
a stator defining stator poles;
a rotor defining rotor poles, the rotor being movable relative to the stator so that the rotor poles are successively alignable with any stator pole;
independently energisable phase windings each associated with at least a pair of stator poles and having an inductance cycle determined by the passage of the rotor poles past the stator poles;
a controller operable to initiate the energisation of the phase windings in a predetermined sequence, the initiation of the energisation of the phase windings occurring in some part of consecutive inductance cycles of the windings in turn in a first mode of operation, and energisation of the phase windings being initiated in the same sequence in which initiation of each phase winding being followed by at least one inductance cycle of that phase with no initiation of energisation, in a second mode of operation.

9. A system as claimed in claim 8 in which the controller is operable to initiate the energisation of the phase windings in the second mode such that the phase windings are energised in sequence consecutively followed by a plurality of consecutive inductance cycles in which there is no initiation of energisation.

10. A system as claimed in claim 9 in which the plurality of consecutive inductance cycles in which there is no initiation of energisation corresponds to the number of phases in the machine.

11. A system as claimed in claim 8 in which the controller is operable to initiate the energisation of a first phase winding in the sequence followed by a plurality of consecutive inductance cycles in which there is no initiation of energisation and, thereafter, energisation of a second phase winding in the sequence.

12. A system as claimed in claim 11 in which the plurality of consecutive inductance cycles in which there is no initiation of energisation corresponds to the number of phases in the machine.

13. A system as claimed in claim 8 in which the machine is a switched reluctance machine.

14. A method of operating an electrical machine, the machine having
a stator defining stator poles,
a rotor defining rotor poles, the rotor being movable relative to the stator so that the rotor poles are successively alignable with any stator pole, and
independently energisable phase windings, each associated with at least a pair of stator poles and having an inductance cycle determined by the passage of the rotor poles past the stator poles, the method comprising:
in a first mode of operation initiating energisation of the phase windings in a predetermined sequence, in which the rate of initiating energisation is equal to the rate at which the rotor poles coincide with a given stator pole, and
in a second mode of operation initiating energisation of the phase windings in the same sequence, in which the rate of initiating energisation of the phase windings is less than the rate at which the rotor poles coincide with the given stator pole.

15. A method as claimed in claim 14 in which the energisation of the phase windings in the second mode comprises initiating the energisation of the sequence of phase windings consecutively followed by a plurality of consecutive inductance cycles with no initiation of energisation.

16. A method as claimed in claim 15 including setting the plurality of consecutive inductance cycles to correspond to the number of phase windings in the machine.

17. A method as claimed in claim 14 in which the energisation of the phase windings in the second mode comprises initiating the energisation of a first phase winding in the sequence followed by a plurality of consecutive inductance cycles with no initiation of energisation and, thereafter, initiating the energisation of a second phase winding in the sequence.

18. A method as claimed in claim 17 including setting the plurality of consecutive inductance cycles to correspond to the number of phase windings in the machine.

19. A method as claimed in claim 14 including configuring the machine to have three or four phase windings.

20. A method as claimed in claim 14 including selecting as the electrical machine a switched reluctance machine.

* * * * *